May 31, 1955
R. J. RISOR
2,709,378
SAW TOOTH SHARPENER
Filed July 13, 1953
2 Sheets-Sheet 1
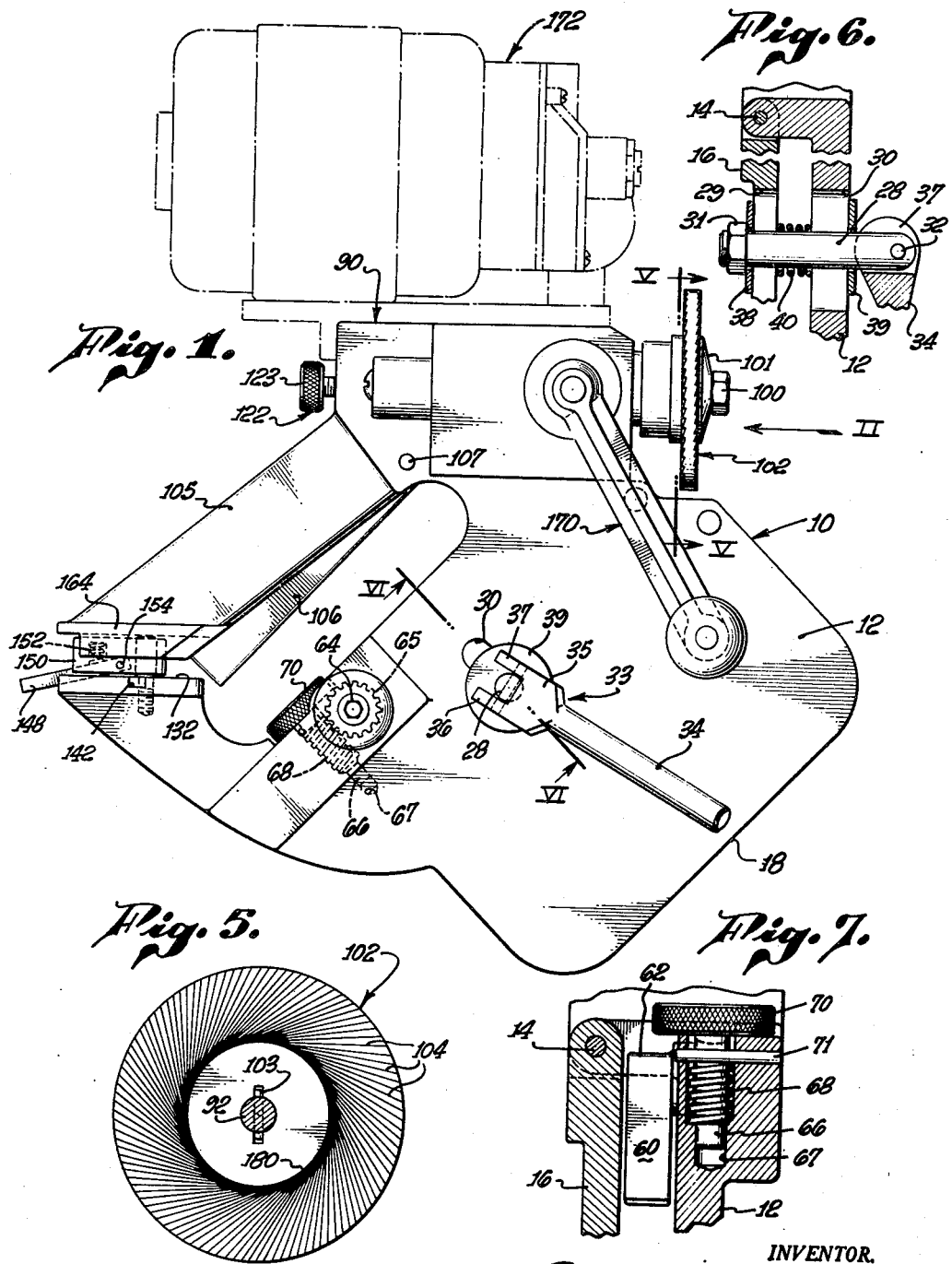
INVENTOR.
ROLAND J. RISOR,
BY
ATTORNEY.

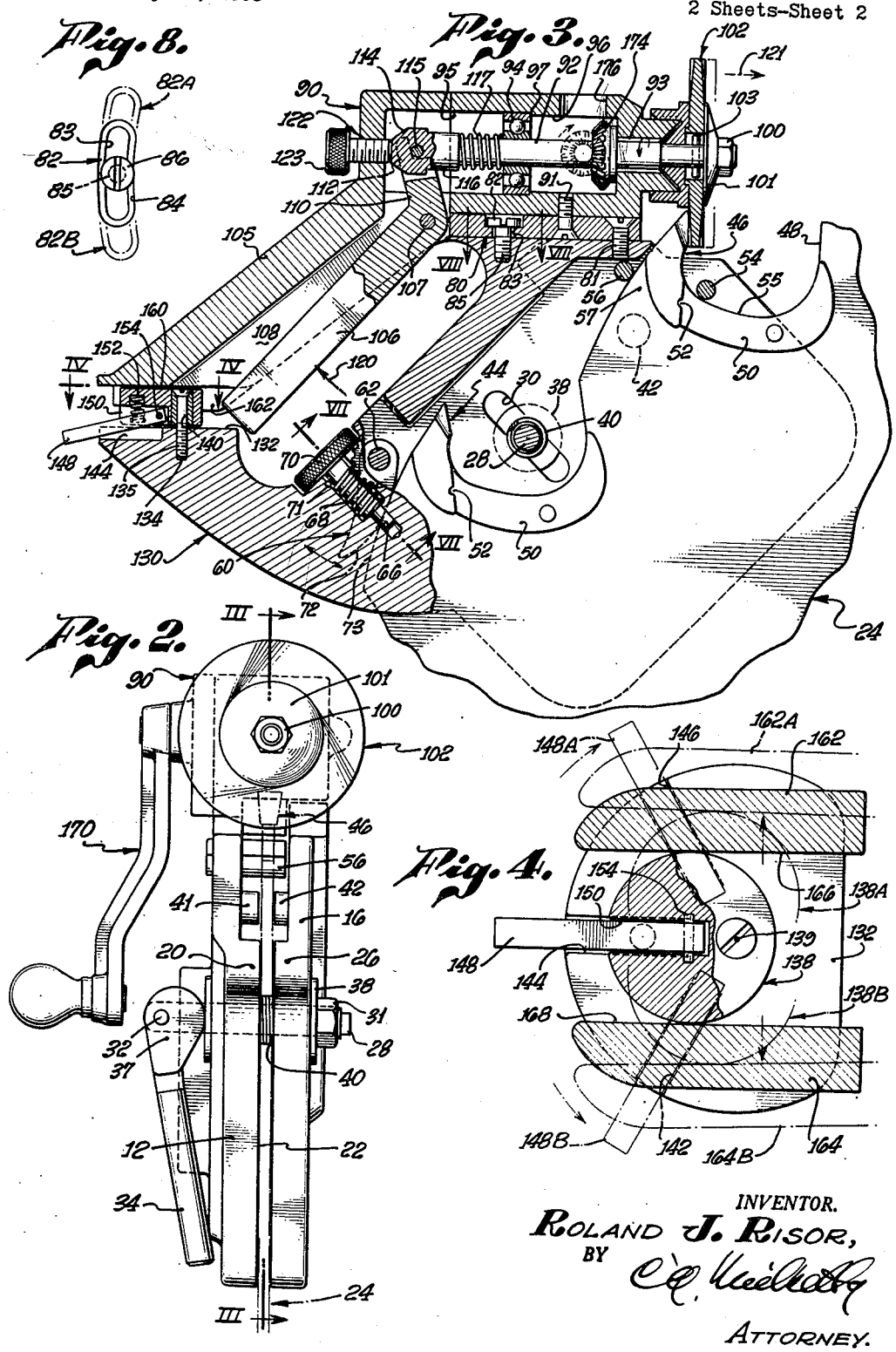

United States Patent Office 2,709,378
Patented May 31, 1955

2,709,378

SAW TOOTH SHARPENER

Roland J. Risor, Santa Barbara, Calif.

Application July 13, 1953, Serial No. 367,639

5 Claims. (Cl. 76—37)

This invention relates generally to saw-tooth sharpeners and particularly discloses a portable device for sharpening the teeth of a rotatable disk saw.

Although devices of some similarity to the present invention have been proposed in the past, such prior sharpeners have been subject to certain disadvantages in use which the present invention overcomes. The disk saw with which the present invention is adapted to be used is rotatable about an arbor or shaft and the body of the saw is relatively thin. A plurality of teeth are disposed around the periphery of the disk saw, each of the teeth having a width somewhat greater than the thickness of the saw. It is desirable in sharpening the individual teeth in such an arrangement to insure that the teeth, after sharpening, will be as nearly identical in physical outline as possible. By this means, as will be readily understood, the saw in use will be capable of making uniform smooth cuts in the log or other workpiece being sawed. The present invention includes means insuring uniformity of grinding successive teeth to a desired depth.

Furthermore, in the use of a saw of the type under discussion it is desirable under certain conditions that the cutting face of each tooth be ground in a plane slightly inclined to a plane perpendicular to the plane of rotation of the saw proper. When teeth are to be so ground it is of importance that the cutting surface of each tooth on a saw be inclined by the same angle to insure uniformity of cutting during use.

By the present invention I have provided apparatus including means for facilitating the grinding of teeth on a disk saw in the desired manner as stated above. The present invention includes means firmly clamping the body of the disk saw adjacent a tooth to be sharpened and positioning means positively locating the sharpening apparatus in the same position relative to each successive tooth as it is sharpened. The apparatus moreover includes means for controllably adjusting the angle of inclination between the plane of the cutting surface of a tooth and a plane perpendicular to the plane of rotation of the saw proper.

A principal object of the present invention therefore, is to provide a novel saw-tooth sharpener for use on disk saws.

Another object of the invention is to disclose a saw-tooth sharpener having a rotatable sharpening element arranged to be spring biased into contact with the tooth.

A further object is to disclose a saw-tooth sharpener having the above characteristics and provided with a sharpening element of novel and efficient design.

Another object of the invention is to provide a saw-tooth sharpener having adjustable positioning means for accurately locating the sharpener relative to each successive tooth being sharpened.

A further object of the invention is to provide a saw-tooth sharpener having accurate locating means for mounting upon a disk saw and including selectively positionable, positive stop means insuring uniformity of grinding of successive teeth of a saw.

Another object is to disclose a saw-tooth sharpener having the above advantageous characteristics which is rugged and durable in construction and yet comparatively economical to manufacture.

These and other objects and purposes of the invention will be understood from the following description of a preferred embodiment thereof taken in connection with the accompanying drawings in which:

Fig. 1 is a side elevational view of a sharpener in accordance with the present invention provided with a manually actuable driving crank; an alternative drive means such as an electric motor is shown in dotted outline thereon.

Fig. 2 is an end view of the sharpener taken in the direction indicated by the arrow II of Fig. 1, a portion of a disk saw and tooth thereof being shown in dotted outline.

Fig. 3 is a sectional view of the sharpener taken upon plane III—III of Fig. 2, the sharpener being mounted upon a saw positioned in sharpening relation with one of the teeth thereof.

Fig. 4 is a fragmentary view taken upon plane IV—IV of Fig. 3, certain portions being shown in dotted outline in selectively adjustable positions in the use of the sharpener.

Fig. 5 is an elevational view of a preferred form of sharpening or grinding wheel taken on plane V—V of Fig. 1.

Fig. 6 is a fragmentary sectional view taken upon plane VI—VI of Fig. 1.

Fig. 7 is a fragmentary view taken upon plane VII—VII of Fig. 3.

Fig. 8 is a fragmentary view taken upon plane VIII—VIII of Fig. 3, the mounting plate slot being shown in dotted outline at each limit of its travel.

In general my invention includes a body portion having a pair of plates depending therefrom, one of the plates being hingedly connected to the body portion and other plate. The plates are adapted to be selectively clamped together and include surfaces which frictionally grasp a saw disk, and at least one of the plates includes positioning pins adapted to rest upon portions of the saw adjacent the tooth to be sharpened to insure accurate orientation of the sharpener relative to the tooth. The sharpener includes also selectively adjustable means for controllably varying the orientation of the grinding surface of the sharpening wheel, as well as adjustable stop means for insuring uniformity of depth of cut taken by the sharpener during sharpening. The rotatable sharpening wheel may be actuated either manually by means of a crank, or if desired, by a suitable source of power such as an electric motor which may be conveniently mounted upon the sharpener.

Referring now in detail to the drawings and particularly to Figs. 1 and 2 thereof, a sharpener according to my invention includes a body portion indicated generally at 10 having an integrally formed downwardly depending plate 12. Spaced laterally from the plate 12 and attached thereto by hinged connection 14 (see Fig. 6) is a second plate 16 extending parallel to plate 12 and of substantially the same size as plate 12. The plate 12 desirably includes along its lower edge 18 an elongated thickened portion 20 (see Fig. 2) having an inner face 22 adapted to contact the flat body portion of disk saw indicated generally at 24. Similarly the hinged plate 16 is provided along its lower edge with an elongated thickened portion 26 adapted to contact the opposite face of a disk saw.

Selectively actuable means are provided for clamping together the two plates 12 and 16 and thus to firmly grip a saw blade 24 held between the two plates. Such means are best seen in Fig. 6 and include a rod 28 extending through a slot 29 formed in plate 16 and through a slot 30 formed in plate 12, one end of the rod 28 being threaded and having thereon a threaded nut 31. The other end of the rod 28 includes a radial bore having a pin 32 therein. A clamping member indicated generally at 33 includes a handle 34 and a bifurcated end portion 35 provided with a pair of spaced arms 36 and 37. As best appears in Figs. 2 and 6, each of the arms 36 and 37 is mounted eccentrically upon the pin 32. A washer 38 overlies the slot 29 and provides means against which the nut 31 abuts. Similarly, a washer 39 overlies the slot 30 and provides an abutting surface on which the enlarged arms 36 and 37 may rest. It will be seen that actuation of the handle 34 into the position shown in Figs. 2 and 6 will result in imposition of force upon the two clamping plates 12 and 16 whereby such plates will tightly grasp a saw 24 therebetween. Conversely, the handle may be rotated upwardly about pivot pin 32 to release the clamping pressure upon the plates 12 and 16 and thus to allow the entire sharpening mechanism to be removed from the saw. In order to facilitate the opening of plate 16 when the clamping means is released, I may provide between the two plates a helical spring 40 surrounding the central portion of rod 28 and bearing at either end against the inner surfaces of the plates 12 and 16 adjacent their respective slots 30 and 29. Preferably additional clamping means are included, comprising inwardly extending bosses 41 and 42 carried by the plates 12 and 16 respectively and adapted to abut the sides of saw 24 when the plates 12 and 16 are clamped together.

Means are provide for accurately positioning the body 10 relative to a tooth to be sharpened. As best appears in Fig. 3, a disk saw fragmentarily indicated generally at 24 includes in its periphery a number of cutting teeth. Two of such teeth are indicated generally at 44 and 46 respectively, the latter tooth being in sharpened position when the sharpener is mounted as shown in Fig. 3. Each of the teeth is fixedly held relative to the saw 24 in a portion of an enlarged recess 48 formed in the periphery of the saw, and as is conventional, means are provided in the form of a retaining ring 50 for holding the tooth 46 in its proper position. Registering means are carried by the tooth 46 and retaining ring 50, such registering means in the present illustration being shown as including a convex protuberance 52 carried by retaining ring 50 and received within a mating recess formed in the lower portion of tooth 46.

The positioning means heretofore referred to include transversely extending support pins 54 and 56 carried on plate 12. One of the support pins, as 54, is adapted to rest upon the concave inner surface 55 of retaining ring 50, and the other support pin 56 rest upon the shoulder portion 57 of the saw 24 immediately behind the tooth 46. The positioning means for the body 10 also include an adjustable member bearing upon the saw 24. As best appears in Fig. 3, the adjustable member indicated generally at 60 may take the form of a movable wing which is pivotally connected at 62 to a depending portion of the body 10 adjacent the upper end of the plate 12. A short shaft constituting the pivotal connection 62 includes a polygonal portion 64 (see in Fig. 1) on which are mounted a spur gear 65 and the movable wing 60. Means are provided for selectively and rotatably moving the wing member 60 to a desired position, such means including a rotatable shaft 66 journaled in a bore 67 formed in the body 10. Shaft 66 includes a threaded portion 68 constituting a worm gear and adapted to mesh with the spur gear 65. The shaft 66 terminates at its upper end in an enlarged knurled hand wheel 70 and is retained in its position as shown by a retaining pin 71 above the upper end of the threaded portion 68. It will be seen that manual rotation of shaft 66 by means of the knurled wheel 70 will rotate the adjustable member 60 whose lower convex surface 72 is adapted to rest upon the shoulder 73 of saw 24 in rear of tooth 44.

A mounting plate indicated generally at 80 rests upon the upper portion of body 10 and is pivotally connected thereto by suitable means such as threaded screw 81 adjacent the front end of the mounting plate 80. In the rear portion of the plate 80 is provided an arcuate slot indicated generally at 82 (see Fig. 8) the curvature of slot 82 being concentric with the pivot screw 81. Slot 82 includes a narrowed or restricted lower portion 83 and an enlarged upper portion 84. A retaining screw 85 is threadedly received in body 10 and includes a head 86 slidably bearing against the upwardly directed shoulders formed at the juncture of the restricted portion 83 of the slot 82 and the widened upper portion 84 of the slot. By the means just described mounting plate 80 may be pivoted around the screw 81 through an arc whose extent is determined by the limits of the slot 82.

A housing indicated generally at 90 is carried upon and connected to the mounting plate 80 being retained thereon by a suitable means such as screw 91 threadedly received in the lower portion of the housing 90. A grinding shaft 92 is rotatably and axially slidably journaled in housing 90 by means of suitable bearing means 93 and 94, the latter being illustratively shown as an antifriction bearing. The interior of housing 90 includes an enlarged hollow chamber 95 and a smaller chamber 96. The bearing 94 is adapted to be seated against the annular shoulder 97 at the juncture of the two chambers 95 and 96.

The shaft 92 extends rightwardly as seen in Fig. 3 through the bearing 93 of housing 90 and is provided at its outer end with a threaded portion carrying a threaded nut 100. A grinding element or wheel indicated generally at 102 is mounted upon the shaft 92 and fixed against rotation relative thereto by suitable conventional means such as key 103 (see Fig. 5). An apertured retaining plate 101 is held in position by the nut 100 and in turn holds grinding wheel 102 in position.

Means are provided for moving the shaft 92 axially within housing 90. Housing 90 is provided with a downwardly inclined arm 105 and a control lever 106 is pivotally connected at 107 to the housing near the upper end of the arm 105. Desirably, the arm 105 may include a longitudinal hollowed groove 108 in which lever 106 may be received. Integrally formed at the upper end of lever 106 is an angularly disposed arm 110. The upper end of arm 110 is bifurcated and includes a pair of upwardly extending fingers, one of which appears at 112. The inner or left end of shaft 92 is rotatably journaled in a bearing cap 114 provided with a pair of laterally extending pins, one of which is shown at 115, the left side of the pins being abutted by the fingers of arm 110. The shaft 92 includes an enlarged portion 116 and suitable resilient means 117 are adapted to urge shaft 92 leftwardly as seen in Fig. 3, the ends of the spring 117 bearing against the enlarged portion 116 of the shaft and against the inner rotatable member of bearing 94. It will be seen that manual actuation of lever 106 in the direction indicated by the arrow 120 of Fig. 3 will cause axial movement of shaft 92 and grinding wheel 102 in the direction indicated by the arrow 121, and release of manual pressure on lever 106 will allow spring 117 to return those parts to their positions as shown. A positive stop means is provided for adjustably limiting leftward axial movement of shaft 92, such means in the present embodiment taking the form of a threaded bolt 122 carried in housing 90 in axial alignment with shaft 92 and adapted, at its inner end, to abut the end of bearing cap 114. Bolt 122 is desirably provided with a knurled head 123 to facilitate manual rotation thereof, so that the leftward limit of axial travel of shaft 92 may be conveniently adjusted.

Normally the plane of rotation of cutter 102 is parallel to the axis of disk saw 24 but under certain conditions it may be desirable that the tool 102 is rotated in a plane which is slightly inclined to the saw axis. I provide in the present invention means for accomplishing such inclination of the sharpening plane of cutter 102. The lower end of body 10 includes an arcuately shaped portion inlicated generally at 130 terminating in a horizontal surface 132, this surface being substantially circular in shape in the preferred embodiment of the present invention. Centrally of the surface 132 there is a vertically disposed threaded bore 134 in which is threaded the lower end of a screw 135. A disk-like cam indicated generally at 138 (see Fig. 4) is rotatable relative to the circular surface 132 about an eccentrically disposed pivot point 139 corresponding to the axis of screw 135. Desirably cam 138 includes a vertical bore 140 in which the shank of screw 135 is journaled, so that cam 138 is retained in position upon circular surface 132 and may be rotated relative to the surface around the axis 139.

Means are provided for retaining the cam 138 in desired angularly rotated positions relative to the surface 132. In the present illustration, and best seen in Fig. 1 and Fig. 4, such means include radial grooves 142, 144 and 146 formed in the circular surface 132. A locating member or key 148 is housed in a groove 150 formed in the lower face of cam 138, the groove 150 being radially disposed relative to the axis 139. Desirably I provide spring means for urging the key 148 downwardly, the spring being indicated at 152 and having its upper end housed in a vertically disposed recess formed in cam 138 and its lower end in a similar recess in the upper surface of key 148. The key 148 is movable in a vertical plane about its inner end which may be equipped with a pivot pin 154 (see Fig. 4) received in complementary recesses formed in the cam 138. It will now be understood that the cam 138 may be rotated about the axis 139 into a desired position, and the radial grooves 142, 144 and 146 indicate three positions where the cam 138 may be retained by reason of the engagement of key 148 in the appropriate groove. It will be obvious that any number of grooves similar to the grooves shown may be provided in the surface of the member 132 to afford any desired number of predetermined positions for the locking key 148 of the cam 138. The key 148 may be manually raised upwardly out of whatever groove it may be resting in and the cam 138 rotated to the desired position, using the key 148 as a lever arm.

Rotation of cam 138 about the pivot 139 provides the angular inclination of the plane of cutting tool 102 relative to the axis of rotation of disk saw 24 previously mentioned. It will be recalled that arm 105 is fixed relative to housing 90 and desirably is formed integrally therewith. The lower end of arm 105 includes a horizontal portion 160 (see Fig. 3) which is recessed upwardly relative to a pair of spaced lips 162 and 164 which may be integral with and extend downwardly from the arm 105. The lip 162 includes a vertically extending side wall 166 and lip 164 similarly includes a vertically extending side wall 168, the side walls 166 and 168 being parallel and spaced apart by a distance equal to the diameter of cam 138 whereby the side walls are in abutting contact with the cam.

Particular reference is made to Figs. 4 and 8 for an understanding of the operation of the key 148 and its associated cam 138. When key 148 is in the central groove 144, the parts are disposed in the position shown in solid lines in the several figures. In this situation, the plane upon which the cutting tool 102 sharpens a tooth is a plane which is parallel to the axis around which the disk saw 24 is adapted to rotate. When, however, key 148 is moved upwardly out of groove 144 and rotated clockwise as seen in Fig. 4 to the position indicated by 148A, it may be housed in the groove 146 and such rotational movement of key 148 will cause the cam 138 to rotate to its position fragmentarily indicated by 138A. The vertical side wall of cam 138 is in abutting contact with the side wall 166 of lip 162. Hence, rotation of cam 138 into its position 138A moves lip 162 into its position 162A. Similarly, the mounting plate 80 and housing 90 fixed thereto are rotated about screw 81 as an axis so that the retaining screw 86 and arcuate slot 82 assume the relative positions indicated at 82A, in Fig. 8. As will be seen, such movement of the parts will cause the cutting tool 102 to be disposed in a plane oblique to the surface of the drawing as seen in Fig. 3 rather than perpendicular to the plane of the drawing as there shown. Consequently, the plane upon which tooth 46 would be ground under these changed conditions would be equally oblique and thus inclined relative to the axis of rotation of saw 24.

Adjustment of the parts in the opposite direction will provide for grinding teeth in a plane inclined to the axis of rotation in the opposite direction. Such movement may be accomplished by moving key 148 counterclockwise as seen in Fig. 4 so that it may be received in the radial groove 142, the new position of key 148 at the time being indicated at 148B. Corresponding rotational movment of cam 138 to the position 138B forces lip 164 into its position 164B, and the arcuate slot 82 of mounting plate 80 moves to position 82B of Fig. 8.

The present sharpener may be driven either manually through a crank indicated generally at 170 or by suitable power means such as an electric motor indicated generally at 172. When crank 170 is used, manual torque applied to the crank is transmitted to shaft 92 through suitable gearing not shown meshing with bevel gear 174 which is slidably but not rotatably mounted upon shaft 92. Rotational power from motor means 172, when used, may also be applied to the shaft 92 through suitable conventional gearing not shown meshing with the bevel gear 174. Desirably a port 176 is provided in the upper wall of housing 90 for accommodating the final drive gear of the motor gear train, and when the motor is not used suitable closure means may seal the port 176.

The particular construction of cutting blades of the tool 102 is especially well adapted for use with a sharpener having the advantages characteristic of the present invention. As seen in Fig. 5, individual cutting edges 104 are disposed tangentially of an interior circle 180 of the cutting tool. Moreover, as best seen in Fig. 3, the grooves between successive cutting edges are deeper at their outer ends than in the region of the inner circle 180. As a result of this preferred construction of cutter 102, sharpening of each blade of a saw is effected by a shearing action oblique to the cutting edge produced upon the sharpened tooth, and because of the greater depth of the outer ends of the grooves between successive cutting edges of the tool 102 small chips and similar pieces of metal ground off the tooth being sharpened are thrown out of the way with greater facility than in the case of conventional cutting tools.

Accordingly it will be seen that I have provided a novel and effective tool for sharpening individual teeth carried on a disk saw. Of particular importance in the present apparatus is the fact that the sharpener is accurately locatable relative to the tooth to be sharpened by means permitting successive duplication of the positioning of the sharpener for successive teeth. Thus each tooth is ground uniformly. Moreover, the clamping structure, including enlarged portions 20 and 26 of plates 12 and 16 respectively, insure that the body portion of the disk saw is firmly clamped when the sharpener is mounted thereon, and the inwardly extending bosses 41 and 42 cooperate in this regard by contact with the saw on the shoulder adjacent the periphery and immediately behind the tooth being sharpened. Since the positioning means including transverse pins 54 and 56 and the adjustable member 60 rest upon well-defined points, uniformity of grinding of successive teeth is assured. The depth of cut taken by the cutting tool in grinding any tooth may be accurately set by adjustment of the positive stop screw 122 and such adjustment is normally maintained constant throughout the grinding of the teeth of any given saw.

It will be seen that the grinding apparatus may be easily carried, with the fingers of the operator grasping the handle or arm 105 and extending through the opening between the handle 105 and the body portion 10. Digital or manual force exerted upwardly on lever 106 moves grinding wheel 102 into its outermost position, rightwardly as seen in Figs. 1 and 3. With the apparatus thus grasped the sharpener may be placed upon the saw in the position dictated by the transverse pins 54 and 56 and the adjustable positioning member 60. Clamping arm 34 is then manipulated to clamp the saw. Release of the force exerted on lever 106 while the cutter 102 is rotated will allow spring 117 to apply constant grinding force upon the tooth being sharpened.

Adjustment of the inclination of the cutter 102 relative to the axis of rotation of the saw 24 is easily accomplished by means of rotation of key 148 as previously described. Under certain conditions it may be desirable to grind successive teeth in oppositely inclined planes, and this may be easily effected by moving the key 148 from the groove 142 to the groove 146 for each successive tooth and continuing to alternate the position of key 148 for succeeding teeth.

Modifications and changes may be made from the specific embodiment of the invention herein shown and described, and all such modifications and changes not departing from the spirit of the invention are intended to be embraced within the scope of the appended claims.

I claim:

1. A saw tooth sharpener for use with a planar disk saw comprising: a body having depending side plates adapted to straddle a disk saw and means for clamping the plates into virtually parallel gripping contact with opposed faces of the saw; a housing mounted on the body for pivotal movement about an axis virtually parallel to and disposed between said plates; a shaft rotatably and slidably journalled in the housing and having an outer portion projecting therefrom; a cutter tool carried on said outer portion; and means for adjusting the angle of the shaft axis relative to the planes of the plates, including a pair of spaced parallel surfaces carried by the housing distant from the first named axis, a member mounted on said body and laterally movable relative thereto, said member being receivable between and engaging said surfaces, and digitally actuable means for moving said member and locking it in a selected position laterally of the body.

2. The invention as stated in claim 1 wherein said member constitutes a cam having arcuate surfaces contacting said pair of surfaces and pivotally mounted on said body eccentrically relative to said arcuate surfaces.

3. A saw tooth sharpener for use with a planar disk saw comprising: a body including means for selective clamping to a disk saw; a housing mounted on the body for pivotal movement about an axis parallel to the plane of a saw; a shaft rotatably and slidably journalled in the housing having an outer portion projecting therefrom; a cutter tool carried on said outer portion; and means for adjusting the angle of the shaft axis relative to the plane of the saw including a member mounted on said body distant from the first named axis and digitally laterally movable relative to the body, and means carried by the housing and engaging said member.

4. A saw tooth sharpener for use with a planar disk saw comprising: a body having depending side plates adapted to straddle a disk saw and means for clamping the plates into virtually parallel gripping contact with opposed faces of the saw; a housing mounted on the body; a shaft rotatably and slidably journalled in the housing and having an outer portion projecting therefrom; a cutter tool carried on said outer portion, said body being provided with positioning means including a pair of transverse members adapted to rest upon a saw forwardly and rearwardly of a tooth to be sharpened and a member distant from said pair of transverse members and having a transverse surface adapted to contact the periphery of a disk saw, said surface being selectively movable radially of a saw.

5. A saw tooth sharpener for use with a planar disk saw comprising: a body including means for selective clamping to a disk saw; a housing mounted on the body; a shaft rotatably journalled in the housing and having an outer portion projecting therefrom; a cutter tool carried on said outer portion; and positioning means carried by the body including a pair of transverse members adapted to rest upon a saw forwardly and rearwardly of a tooth to be sharpened and a member distant from said pair of transverse members and having a transverse surface adapted to contact the periphery of a disk saw, said surface being digitally selectively movable radially of a saw.

References Cited in the file of this patent

UNITED STATES PATENTS

| | | |
|---|---|---|
| 987,466 | Jensen et al. | Mar. 21, 1911 |
| 1,456,402 | Ramsey | May 22, 1923 |
| 2,439,279 | Andrus | Apr. 6, 1948 |
| 2,568,062 | Fitch | Sept. 18, 1951 |
| 2,643,553 | Evanoff | June 30, 1953 |